United States Patent [19]

Emmons et al.

[11] 4,106,726
[45] Aug. 15, 1978

[54] PRESTORED AREA CORRELATION TRACKER

[75] Inventors: David L. Emmons, Orlando; Richard E. Roberts, Winter Park; Edward Pasko, Orlando; George Lamar Harmon, Winter Park, all of Fla.

[73] Assignee: Martin Marietta Corporation, Orlando, Fla.

[21] Appl. No.: 873,864

[22] Filed: Nov. 4, 1969

[51] Int. Cl.[2] .......................... F41G 7/00; F42B 15/02
[52] U.S. Cl. .................................. 244/3.17; 250/201; 250/203 R
[58] Field of Search .......................... 250/201, 203 R; 244/3.17

[56] References Cited

U.S. PATENT DOCUMENTS

| 3,290,506 | 12/1966 | Bertram | 250/203 |
| 3,372,890 | 3/1968 | Bogard | 244/3.17 |
| 3,416,752 | 12/1968 | Hembree | 244/3.17 |

Primary Examiner—S. C. Buczinski
Attorney, Agent, or Firm—Julian C. Renfro; Gay Chin

[57] ABSTRACT

A novel prestored area correlation tracker comprising multiple concentric field of view apparatus in combination with apparatus for memorizing multiple digital representations of a target scene and logic apparatus to utilize such representations for the purpose of recognizing said target scene and accurately maintaining a desired aim point in the scene. A primary embodiment utilizes a small field of view apparatus in conjunction with self made direct view memories for tracking the target scene during range closure, and a large field of view apparatus in conjunction with the previously stored memories for initial pointing and intermediate corrections of the afore-mentioned tracking, with said small field of view tracking minimizing the number of prestored memories required for intermediate corrections.

25 Claims, 8 Drawing Figures

PRESTORED AREA CORRELATION TRACKER

This invention relates to a tracking system for a missile or other vehicle, and more particularly to a tracker equipped with a prestored memory arrangement such that a plurality of related signals as a record indicative of the appearance of the area around a desired aim point can be memorized or stored and thereafter successively utilized in order to provide progressively smaller area representations of the scene about the aim point.

In the general type of tracking system with which this invention is used, there is provided means to scan the target area and to develop a contrast pattern uniquely characterizing the target. The system includes a memory to store several reference contrast patterns and means to periodically utilize the appropriate reference pattern as closure is effected between the tracking system and the target.

An initial contrast pattern is stored for use at a specific point in the flight, by prestoring data produced by another scanner. At a succession of times during range closure, additional contrast reference patterns are utilized to realign the tracker with the target. Between these realignments of the tracker, the tracker scanner operates to provide intermediate reference scans for aiming the tracker until the next prestored reference is used. Using either prestored references or intermediate references, memorized and live patterns are compared and correlation signals produced from which are derived control signals for use by the tracker.

As the result of the circular scanning arrangement, the contrast pattern generated thereby comprises a continuous (or appropriately digitized) signal representative of the target contrast as a function of the angle of rotation of the scanning element. The memory system is preferably a rotating device operating synchronously with the scanning means, or any other suitable arrangement whereby the information stored therein is representative of the contrast pattern as a function of the scanner angle. The live and memorized patterns are correlated to provide information representative of the amount of angular misalignment between the two patterns. This information is further processed and roll, pitch and yaw control signals are generated for modifying the orientation of the optical axis of the tracker to minimize the angular misalignment between the current and memorized contrast patterns.

The tracker is electronically or mechanically gimballed within the missile to decouple the tracker from missile attitude motion. This permits three angular degrees of freedom for the optical axis thereof. Under such circumstances, the pitch and yaw signals (and in certain instances the roll signals) referred to above serve only to re-orient the tracker axis. Suitable sensors associated with the tracker serve to detect changes in tracker spatial orientation, which in turn are used by the missile autopilot to properly steer the missile to the target. A system such as described above is shown in assignee's U.S. Pat. No. 3,372,890 by James R. Bogard et al, entitled "Data Processor for Circular Scanning Tracking System," and in the assignee's U.S. Pat. No. 3,416,752, to Clyde R. Hembree entitled "Correlation Guidance System having Multiple Switchable Field of View".

The Bogard patent is primarily concerned with a novel closed loop data processor for a circular scanning tracking system by which the correlation information may be converted into roll, pitch, and yaw control signals. The present invention includes an independent, though complementary system by which there is provided information in the system memory at the appropriate times in order to prevent the build-up of errors which result due to the range closure between the target and the missile.

As described in detail below, the correlation of the reference contrast pattern and the currently acquired pattern is directly affected by the fact that the distance between the missile and the target is constantly decreasing until missile impact. The first effect on such range closure is that of "object blow-up". As the missile approaches the target, all of the objects within the field of view of the scanner appear to be increasing in size. Thus, the target scene changes because portions of the originally memorized pattern disappear radially outwardly from the field of view, as the missile approaches the target. Because the live and stored scenes would eventually have only random similarity, the final aim point position would be unacceptable.

The second range closure phenomenon might be termed "horizon effect". For purposes of description, the area observed by the scanner field of view could be composed of both sky and ground surfaces, two contrastive regions separated by the horizon. As the missile approaches the target, the intersections of the scanner field of view and the horizon do not appear at a constant angular position in the scan. Thus, the correlation between the stored and the current data will be such that the system will attempt to reorient the tracker to maintain the original angular relationship with the horizon. This causes the original aim point to shift due to the interaction between live and stored horizons during range closure. This horizon effect exists to a larger or smaller degree in all scenes, viz. city streets, rivers and the like. In an attempt to correct such errors, the orientation of the tracker axis is moved in random directions with respect to the target. For many applications, such as for example hitting a hard target with a small error, this random motion would be unacceptable.

Prior to this invention, several techniques had been proposed to compensate the errors accruing from range closure effects. One such technique is to include means within the system to periodically rememorize the target scene. This approach has been used by the assignee of this invention, but it alone cannot correct the tracking error due to the horizon effect, and as to blow-up effects, can only limit the extent and/or the rate at which such error is permitted to grow. As may be understood, each rememorization of the target scene results in the insertion into the memory of target source intelligence correlative to the target scene actually viewed by the tracker at the time of rememorization. Thus, any errors present in the orientation at such time, e.g. due to angular misalignment, servo noise, etc., are included in each new reference target pattern. The accumulation of such errors through successive rememorizations, may under certain circumstances lower the system's over-all tracking accuracy to the extent that its effectiveness is decreased, for example, in an attack on a "hard" target where a direct hit is essential.

Alternatively, because an optical system having a given field of view will scan continuously decreasing areas as the distance between the missile and the target is decreased, and, in effect magnify the image more and more, causing the accrual of drift errors due to the horizon effect, it has been proposed that the range closure effects described above could perhaps be compensated for by increasing the field of view of the optical system during range closure. One approach of this type was seen to involve the use of a mechanical zoom lens in the optical portion of the tracker. However, when such an obvious arrangement was tested by the assignee, it proved to be undesirable because of the complexity of the required mechanical systems, because of the low speeds of response thereof, and because of the tendency for the optical boresight of a zoom lens of this type to "helix" and to exhibit other mechanical tolerance limitations as the missile approaches the target. A further disadvantage is that the optical "gain" of the system is steadily decreased, thereby lowering the angular accuracy of the tracker. This increasing angular perturbation of the tracker would have a catastrophic effect on missile control.

In contrast to the latter approach, the system of the present invention substantially overcomes the difficulties of previously used variable field of view optical systems, and provides a means whereby the effects of range closure on the accuracy of the correlation guidance system may be substantially eliminated. The present invention is adapted for use in an optical correlation guidance system such as shown in the above-mentioned Bogard et al U.S. Pat. No. 3,372,890, when taken with a multiple switchable field of view arrangement as taught in the assignee's copending application Ser. No. 783,058, filed Dec. 11, 1968, entitled "Shiftable Scanner Aperture," by Shoch and Harmon, now replaced by Continuation Application Ser. No. 90,781, and with a prestored memory arrangement as taught herein. The Shoch et al invention entails the use of a pair of apertured scanner discs disposed on the image plane of the objective lens and rotatable together, but in addition also being relatively movable for a limited extent. When in one relative position, the two discs together define a scanner slit located on a comparatively large radius, such that a large field of view is achieved, whereas when in a different relative position, the two discs together define a scanner slit on a comparatively small radius, such that a small field of view is achieved.

The Shoch shutter arrangement is of course followed by a suitable photodetector, memory means, shutter control means, and means to correlate current target data with information stored in the memory, such as by the technique set forth in the now-allowed Harmon invention entitled "Binary Phase Comparator," Ser. No. 509,993, filed Nov. 26, 1965, now U.S. Pat. No. 3,521,172 and assigned to the assignee of the present invention.

Turning now to a consideration of the present invention, it involves a tracker for determining angular misalignment between the actual aim point of a missile, and a desired aim point, and includes memory means for memorizing or storing a plurality of related signals representing the scene appearance at successively closer ranges to the desired aim point, scanning means for generating a live signal indicative of the area about the actual aim point, and means for generating realignment signals to provide realignment between said live signals and said memory signals.

The memory means may involve a prestored memory portion as well an an automatic portion, with it being the purpose of the prestored portion of the memory to contain and carry during the travel of the vehicle, a plurality of related signals forming a record that is indicative of the appearance of the area around a desired aim point, which prestored memory portion may be successively utilized in order to provide progressively smaller area representations of the scene about the aim point.

The scanning means takes the form of a basic slit scanning arrangement modified to include the teachings of the above-mentioned Shoch and Harmon "Shiftable Scanner Aperture" invention, thus enabling our tracker rapidly to shift as necessary between a large field of view optical arrangement desirable because of its large angular pull-in capability, and a small field of view optical arrangement desirable from the standpoint of its accurate tracking properties.

The means for generating realignment signals makes it possible for the prestored memory information to be utilized periodically for updating the aim point of the vehicle, with a servo arrangement being used to reposition pitch and yaw gimbals of the tracker, so as in turn to reposition the optical axis along the original aim point or line of sight to the target as represented by the digital signatures obtained and memorized at the time of the original aiming.

The means for generating realignment signals may be used in concert with a rememorization technique, involving an automatic memory arrangement utilizing a pair of data tracks. At a given moment, one of these data tracks may be regarded as containing old or reference data, and another track regarded as containing new or current data, with the arrangement of write amplifiers and read amplifiers associated with these tracks being connected such that as one data track is receiving new data, the other data track is reading out old data. At the time the old data would tend to become decorrelated due to range closure, a signal is given which causes the automatic memory tracks in effect to alternate functions, thus bringing about an updating of the track previously regarded as containing old data by supplanting the old data with new data. It should be noted that this rememorization procedure may take place a number of times before the next prestored memory is called out, and although this procedure does not serve to re-aim the missile exactly toward the desired target, these rememorizations serve to minimize the "blow-up" and "horizon" effects to the extent that a minimum of prestored memories is required for correcting the aimpoint. This rememorization procedure also provides a fail safe or standby means to steer the missile to the vicinity of the target in the case a prestored memory does not correlate due to ground explosions or component failure not affecting this rememorization function.

A correlation detector may be provided for automatically bringing about rememorizations as needed, and the function of the correlation detector is accomplished by measuring the coincidence of the live data pulses from the optics and video section of the missile, with reference data provided by the automatic portion of the memory. The coincidence function is then averaged by a filtering device and threshold detected at a preset threshold by a high gain amplifier. The output of this amplifier indicates the level of decorrelation, with the arrangement being such that when the output drops to a predetermined level, a rememorization pulse is developed, which causes the automatic portion of the memory to rememorize.

As previously indicated, multiple references representing various magnifications of the desired target are stored in the magnetic memory of the tracker before take-off or just before missile launch, with these references to be called out successively, such as after a certain number of rememorizations have taken place, or on command from a radar altimeter for example.

In the case of an embodiment of this PACT invention known as "Store-Down-Stream," four prestored references are used, which are obtained by the use of an aircraft-mounted scanning device referred to as a Magnifier Scanner Tracker (MST). The MST device is an invention represented by a patent application of Richard E. Roberts et al, assignors to the assignee of the present invention, Ser. No. 874,538, filed Nov. 6, 1969, and consists of a gimballed and stabilized correlator scanner operating with a closed circuit television system arranged so that the pilot or operator of a launching aircraft can accurately align the optical axis of the correlator scanner by use of the closed circuit television, which television axis (reticle) is accurately boresighted with the correlator scanner axis. The MST has two optical fields of view which are utilized in the television system for increasing the magnification and hence the alignment accuracy of the optical axis. This correlator scanner has a mechanical two field of view Shoch shutter arrangement which therefore along with the two optical fields of view provides four fields of view for correlator scanning. Four references obtained by the MST using these four fields of view are automatically sequenced into the tracker memory after the pilot or operator has aligned the optical axis of the television scanner combination with a target of opportunity. Upon detecting the fact that all of the references have been entered into and memorized by the missile, a command is generated which automatically launches the missile provided that the tracker is locked onto the appropriate reference just received from the scanner.

The fields of view of the MST scanner are controlled accurately to correspond to the large field of view of the missile tracker at specific percentage of range subsequent to launch. Thus, the first MST reference is used for positioning the tracker axis at the launch range, whereas the second reference comes into use at about 45% ($1/\sqrt{5}$) of the original launch range. Thereafter, the successive references are called out and utilized each time a position is reached representing a 45% range to go, thus making it possible for the path of travel of the missile to be corrected a number of times, such as three times, during the time of travel to the target. As mentioned before, these prestored references are stored in the tracker of the missile just before launch, by the use of the Magnifier Scanner Tracker device carried at another location on the launching aircraft.

The above-mentioned closure to positions representing 45% of the range to go determines the nominal angular field of view (FOV) for each of the four MST generated references. For example, if the large FOV of the PACT was 20°, the largest of the MST FOV's would also be 20°, and as a consequence the other three MST FOV's would be 8.9°, 4°, and 1.8° to be consistent with the several closures to points representing 45% range to go. It is noted here that all but the 20° FOV reference are "nominal" in that the outer edge of the FOV produces the above-mentioned included angles only in the yaw plane. For the MST FOV's to match the PACT's large FOV at other than the launch range, the MST scanning slit radius must be varied as it goes through 360° of rotation. The slit radius scans out an ellipse with the major axis in the pitch plane and the scan axis at the focus at the bottom of the scan. The ratio of major to minor axis is dependent on the line of sight depression angle and the relative range at which the reference will be used by the PACT. The ellipse is a circle at the launch range for all depression angles. The ratio of major to minor axis increases the further from the launch point the reference is to be used by the PACT and the bigger the line of sight angle is from the vertical. Again, if the line of sight were vertical, the ellipse is a circle for all ranges.

The MST uses a combination of optical masks in the image planes of the MST to block the light at the outer edge of the scanning slits to produce a variable slit length, thereby generating the elliptical scan of the proper shape and position relative to the scan axis.

Another embodiment of our PACT invention is known as the Distance Measuring Equipment embodiment (DME PACT), and is a terminal guidance scheme utilizing a prestored area correlator tracker (PACT) in addition to a DME transponder, both located in the missile airframe. The DME transponder is part of a triangulation mid-course guidance system which utilizes two ground stations and two loitering aircraft for the purpose of determining the real time position of the missile from the ground station baseline. The guidance error associated with the DME technique is small enough so that a correlator system with a single 20° field of view prestored reference would always find the actual target at the end of a DME midcourse guided flight.

The references that are prestored in the missile are generated by the use of a piece of ground equipment referred to as a Reference Insertion Device (RID). This device is an invention of Charles T. Lakin et al, assignors to the assignee of the present invention, being represented by patent application Ser. No. 63 filed Jan. 2, 1970, and is similar to a high magnification autofocus enlarger whose function it is to interpret a photographic plate on which has been placed a reconnaissance photograph, obtained by an actual reconnaissance flight. From this photograph, a plurality of references is made, which are to be used during range closure. Thus, the DME PACT system is designed to furnish a highly accurate terminal guidance function by coverting such photographic data into four or more area correlator signatures, which are prestored in the missile.

As an example of the use of a DME missile that has been programmed by the use of a RID device, the launching aircraft takes off with the missile while keeping in contact with a spaced pair of ground stations with which the aircraft position can be triangulated. The aircraft flies toward the target but, depending upon the range of the missile, need not approach any closer than say 20 to 50 miles from the target.

In the typical instance, two loitering aircraft are utilized in concert with two ground stations, as previously mentioned, and these four elements are so arranged with electromagnetic equipment that the positions in terms of ground coordinates of the two loiter aircraft are known at all times. The two aircraft along with the missile and its transponder form a triangle. By means of the transponder in the missile, distance information from the missile to the two aircraft is determined and since the separation of the two aircraft is known, the missile location relative to the target can be determined by triangulation with relatively high accuracy. The autopilot in the missile can be directed by an electromagnetic link to correct its flight path so as to arrive not only at the correct target coordinates but to arrive at the correct target coordinates along a predetermined line of flight.

Upon nearing the target coordinates, the missile system is placed in a near vertical trajectory and as it approaches a predetermined altitude such as 10,000 feet, the first prestored picture is switched into operation and the correlator proceeds to track. The midcourse system previously discussed will always place the missile within the pull-in capability of the PACT, using a 20° field of view. The prestored pattern was typically stored or memorized to correspond with what is actually seen by the missile in the 20° field of view as it passes through the 10,000 foot level. Just prior to reaching the 10,000 foot level, a radar altimeter located in the missile causes the PACT to switch to the 20° field of view and go into the track mode, using the first prestored reference which was prestored previously for use at a scaled range of 10,000 feet. As the missile passes through the 10,000 foot level, a correlation peak detector measures the point where the live scene in the 20° field of view reaches the best match with the prestored reference. At this point, the system switches to the 4° field of view, and uses automatic rememorization until the radar altimeter indicates the altitude for using the next reference. When approaching for example the 5,000 foot level, the radar altimeter causes the system to switch out of the 4° field of view mode and into the 20° field of view tracking mode, using the second prestored reference, which was scaled to match the actual scene as seen from 5,000 feet in the large field of view. As the point of best match is again detected, the PACT switches to the small field of view and again range closes, using automatic rememorization. Prior to reaching 2,500 foot level, the radar altimeter causes the system to switch to the third prestored reference and the track mode, using the large field of view. The correlation peak is again detected at 2,500 feet at which time the system goes back to the 4° field of view and tracks the target using automatic rememorization. Prior to reaching 1,250 feet, the radar altimeter calls up the fourth reference and causes the system to go into the track mode using the large field of view. If this is the last reference to be used, the automatic tracking from this point to the target determines the accuracy of the over-all system. Once the best match between the live data and prestored fourth reference is detected, the system goes into the 4° or small field of view and tracks all the way to the target, using automatic rememorization.

A preferred way of loading the prestored references for use in a DME missile is by the use of the Reference Insertion Device which, as previously mentioned, is a piece of ground based equipment designed to receive reconnaissance type photographs which are scaled and magnified by the RID so as to present to a scanning device for generating correlation signatures, a correct appearance of the target area at preselected altitudes. For example, the photograph may have been taken at 25,000 feet altitude, and by the use of the RID, a plurality of related references may be obtained concerning the target that will serve in the aforementioned manner to guide the missile to the target. The first reference could even be of a different altitude than that at which the reference was taken, and by way of example, could be scaled to apply to an initiation of terminal tracking via PACT at an altitude of 20,000 feet. The second reference in this example would be designed to be used at a slant range of say 10,000 feet, with the remaining references being used each time an additional 50% range closure takes place.

It is an object of this invention to provide a highly accurate missile guidance system by use of a selected number of previously memorized digital patterns at specific distances from a target realigning the aim point of the guidance system accurately as the missile progresses in flight to the target.

It is another object of this invention to provide a highly accurate tracker that can utilize a plurality of related digital references indicative of a target scene, which references can be called out in a pre-established sequence and utilized in a highly effective manner to guide a vehicle to a desired location in the target scene.

It is yet another object of this invention to provide a prestored area correlator utilizing multiple references pertaining to a selected target, with such multiple references being utilized in a sequential manner and in coordination with a multiple field of view optical arrangement such that a vehicle can be guided in a much more accurate manner to a preselected location than was hitherto possible.

It is still another object of this invention to provide a prestored area correlator for an air to surface missile in which the sequential references relating to the target scene can be stored at the beginning of a mission or obtained in flight prior to launch of the missile.

It is yet still another object of this invention to provide a tracker utilizing a plurality of prestored refences, employed in conjunction with automatic rememorization means for periodically updating intermediate non-prestored references representing the area around an aim point, thus enabling the number of prestored references required for complete range closure to be minimized.

These and other objects, features, and advantages will be more apparent from a study of the appended drawings in which.

DETAILED DESCRIPTION

Figure 1:
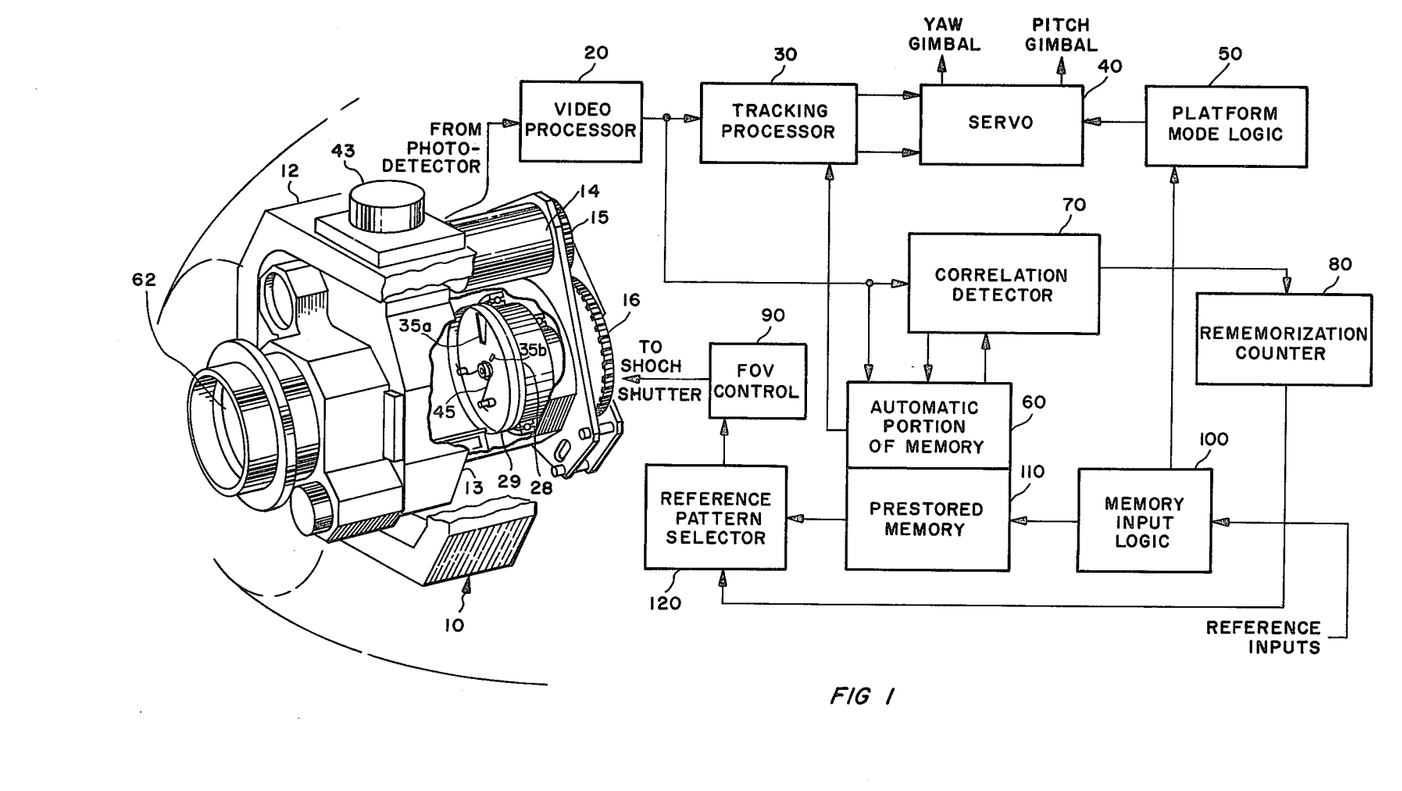
FIG. 1 is a simplified perspective view of the gimballed portion of our Prestored Area Correlator Tracker invention, with portions removed to reveal Shoch shutter details, and with the tracker being shown in conjunction with a block diagram of the principal components of this invention.

Turning now to FIG. 1, it will be seen that we have there illustrated a Prestored Area Correlator Tracker (PACT) 10 in accordance with our invention, with portions cut away to reveal internal construction vital to an understanding of the structure and operation of this invention. This tracker is to be mounted in the nose of a missile or the like, directly behind a transparent nose dome 61; see FIG. 2. An objective lens 62 is disposed near the front end of the tracker and arranged to convey optical images of the target area to the components involved in guiding the missile to impact on the target.

The lens is mounted in a generally tubular housing member 13 that may be regarded as part of the yaw gimbal. Suitable upper and lower trunions (not shown) extend into rotary contact with pitch gimbal 12, with the arrangement being such that the member 13 may move from left to right (move in yaw) with respect to a vertical plane passed through the centerline of the nose-cone. The pitch gimbal 12 is in turn mounted on trunions, these being placed on the left and right of the gimbal, so that the gimbal 12 may move up or down. The trunions of the gimbal 12 are fastened to and supported by gimbal support ring 47 visible in FIG. 2. Each gimbal is positioned by its respective motor (not shown), in response to signals from servo 40.

The member 13 has a circular, hollow interior portion 25, having a centerline 26 coincident with the centerline of the gimbals, on which centerline the lens 62 is disposed. Also disposed on this centerline, and to the rear of the lens is a Shoch shutter arrangement in the nature of that defined in the above-mentioned copending application of Shoch and Harmon entitled "Shiftable Scanner Aperture". The Shoch shutter is here principally represented by apertured rotatable disks 29 and 28 disposed on the image plane of lens 62, which disks are relatively movable, yet designed to rotate together at a speed of say 3,600 rpm so that the scanning function may be provided. However, we are not to be limited to this speed. These disks generally are along the lines of the disks bearing the same numbers and described in the Shoch et al application.

Figures 2, 2A:
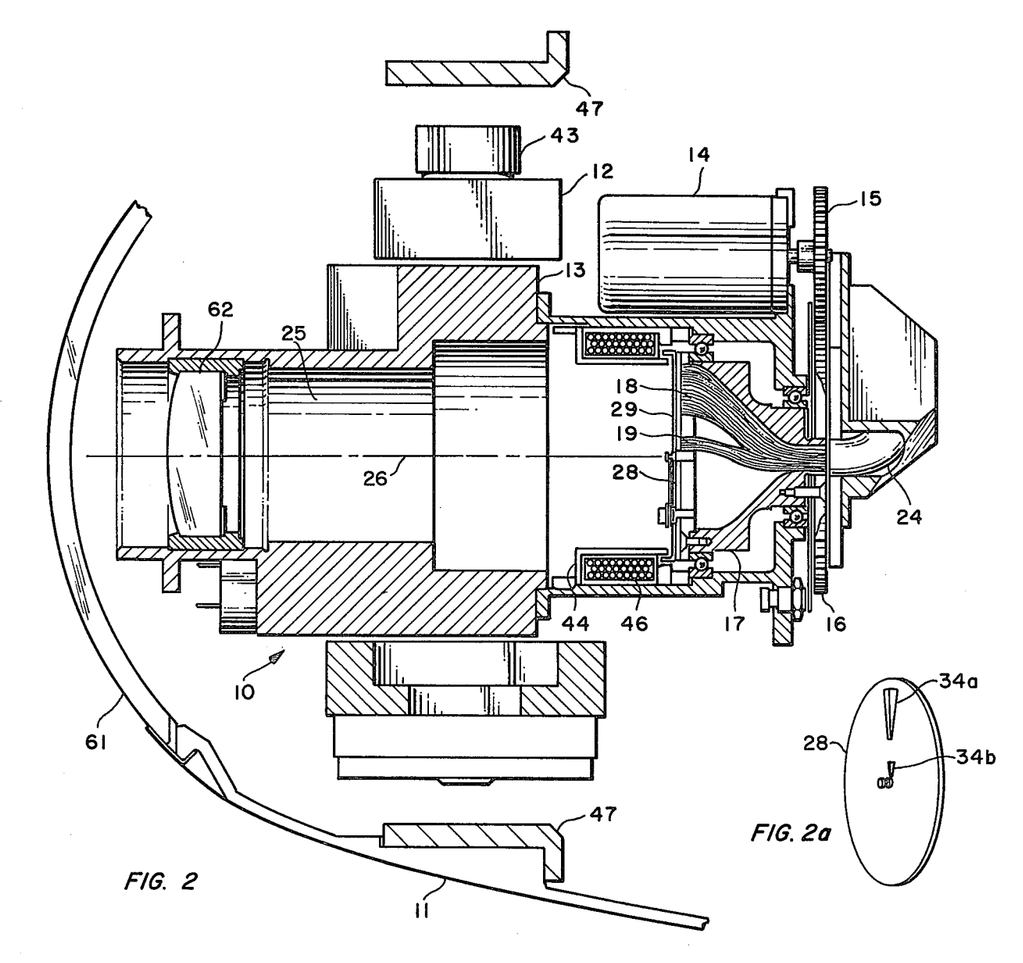
FIG. 2 is a cross sectional view of the gimballed portion of our tracker, revealing a preferred position in the nose of a missile or other vehicle.
FIG. 2a is a fragmentary showing of the rear disk of the Shoch shutter of FIGS. 1 and 2.

As shown in FIG. 1, the disk 29 is provided with two apertures 35a and 35b, which may be selectively brought into coincidence with respective slits 34a and 34b in disk 28, shown in FIG. 2a. The slit 34b is scaled to scan the 4° FOV, while the larger slit 34a is scaled to scan a 20° FOV. A bundle of fiber optics 18 is disposed in rotatably mounted member 17 to which the disk 28 is attached, with the front ends of the fibers disposed directly behind the slits 34a and 34b; see FIG. 2. A spin motor 14 is arranged to drive the rotating member 17 in rotation, this being accomplished through gears 15 and 16 as shown in FIG. 2. It should be observed that disk 29 is relatively movable with respect to disk 28, with a suitable spring 45 being mounted so as to tend to force the disks in a preferred position, such as, for example, with the large aperture 35a in alignment with the aperture in disk 28 behind which the large fiber optic bundle 18 is disposed. Thus, the spring 45 holds the movable aperture 29 in the 20° or large field of view position normally.

In accordance with the Shoch and Harmon invention, a drag may be placed upon the disk 29 serving to move it in a direction overcoming the bias of the spring 45, and causing the large aperture 35a to move out of alignment with the large aperture 34a of FIG. 2a. At the same time, the smaller aperture 35b is brought into alignment with aperture 34b disposed in disk 28 directly in front of the small optic fiber bundle 19, thus accomplishing a switching of the fields of view in accordance with the Shoch and Harmon invention. As explained in the Shoch et al application, a toroidally shaped coil 44 may be provided adjacent the periphery of the disk 29, with energization of this coil by the flowing of current through the turns of wire 46 causing a braking effect upon the disk 29, causing it to move a limited number of degrees with respect to disk 28 (as permitted by a pin and slot arrangement), and thus bringing about a switching to the small field of view. Inasmuch as the disks 28 and 29 are disposed upon the image plane associated with the lens 62, this relative movement of the disks is the equivalent to switching from a large field of view lens arrangement to a small field of view lens arrangement in accordance with the teachings of the Hembree U.S. Pat. No. 3,416,752, issued to the assignee of this invention on Dec. 17, 1968.

Obviously, the rapidly rotating fiber optic bundles behind the disks cannot be directly connected to a non-rotating light sensing device, and accordingly, the continuation 24 of the fiber optic bundle is separated by a small air gap from the rear end of the rotatable member 17, with the fiber optics of the bundle 24 leading around so as to connect to a suitable light detector such as a photodiode or a photomultiplier tube (not shown), which serves to convert the light into a varying electrical signal that is dealt with herein by suitable processing equipment.

More particularly, the light from the area of the intended aim point strikes the objective lens 62, which acts as a light-collecting and image-forming lens. Located on the focal plane of lens 62 is a scanning disk arrangement, preferably in the nature of a Shoch shutter as described in the previously identified copending application of Shoch and Harmon. This device, as previously mentioned, gives a multiple field of view capability to the scanner while necessitating the use of only a single lens 62. The effective slit area of our device rotates at a speed of say 40 rps to 100 or more rps, but typically at a speed of 60 rps. The angular velocity and phase of the slit must coincide accurately with the angular velocity and phase of the associated memory drum.

The rotating disks circularly scan narrow radial portions of a target area about the line of sight of the PACT unit, thereby generating an angularly-dependent contrast pattern which uniquely characterizes the area immediately surrounding the instantaneous tracker point. Thus, this slit arrangement samples and averages the light passing through the optical arrangement, which light has a certain average value at any given instant of time. A Photodetector such as a photomultiplier tube converts the light and dark portions of the target viewed by the optical arrangement into an analog voltage, which changes during the rotation of the scanner arrangement. As will be seen hereinafter, this analog voltage, after being quantized, can be placed upon a prestored memory arrangement, with the tracks of the memory drum being arranged to rotate in synchronization with the scanner arrangement (Shoch shutter), so that various updating techniques and various switching between memory tracks in accordance with this invention may be carried out.

The signal from the photodetector is delivered to the Video Processor 20, which serves to filter and threshold detect the voltage output. The quantized digital signal so generated has edges representing unique phase information to which the present technique responds. The quantized digital signal is processed for tracking purposes by the Tracking Processor 30, which device generates pitch and yaw error signals used to drive the servo 40. This latter device functions to reposition the pitch and yaw gimbals by means of the motors (previously mentioned) provided for such purpose, and this in turn causes the optical axis to be repositioned along the original aim point relative to the digital signature obtained and memorized at the time of the aiming of the device.

The quantized digital signature is also provided from the Video Processor 20 to the Correlation Detector 70 to be compared or correlated with the particular memory being used at any given moment. When device 70 has detected a certain predetermined mismatch, a signal to update the Automatic Portion of Memory 60 is generated and acted upon by simply switching tracks in this memory, thus causing the last scan from the Video Processor 20 to be stored in Memory 60.

As will now be apparent, we provide a two section memory, involving the aforementioned Automatic Portion of Memory 60, and a Pre-stored Portion of Memory 110. The Automatic Memory involves two tracks and is related strictly to the small field of view of the scanner, whereas the Prestored Memory typically has plurality of tracks and is related strictly to the large field of view of the scanner. In the preferred embodiment of this invention, it is used with a Magnifier Scanner Tracker device having a four field of view capability, in which instance the Prestored Memory has four tracks, which are typically prestored by action of the Memory Input Logic 100 based upon information received from the associated Magnifier Scanner Tracker device.

For example, the MST may have 1.8°, 4°, 20°, and 8.9° fields of view, with the target information derived using each of these optical arrangements being stored in the memory 110. Storage is brought about in the above-named order to minimize the number of shutter operations necessary in the MST. At the time the MST has been accurately aligned with the target the pilot wishes to hit with the missile, he causes a control signal to be generated in the MST, which is received in the memory system of the missile depicted in FIGS. 1 and 4. This causes the memory of the missile to record the MST area correlator digital signature, and more particularly, it causes the 1.8° field of view information to be recorded in the last track of the memory 110. Several scans of the MST scanner may be required to assure the proper entry of this information into the proper track.

Following the prestoring of the 1.8° field of view information, the MST switches to the 4° field of view and sends a signal to the missile memory, causing it to record the 4° field of view information in the next-to-the-last track of the memory 110. The switching involved in the memory control is accomplished by the use of NAND/NOR logic in a conventional manner. Following the storage of the 4° field of view information, a similar operation is utilized for prestoring on respective tracks, the digital signatures from the MST corresponding to the 20° field of view and the 8.9° field of view, respectively. At the trailing edge of the last prestored signal, a detector in the missile recognizes the fact that the last signal has in fact been prestored, and a pulse is generated by this detector which causes the tracker in the missile to go into the track mode in the large field of view, using the 20° field of view. reference just received from the MST. As a result of this operation, the tracker in the missile will immediately pull in and align itself with the MST to the extent of aiming at the intended target. Thereafter, the missile is launched, with these four prestored memory tracks being successively called out in order to provide progressively closer representations of the aim point to the tracker, thus assuring the excellent accuracy of this system. This procedure will be discussed in greater detail hereinafter.

Figures 3A, 3B:
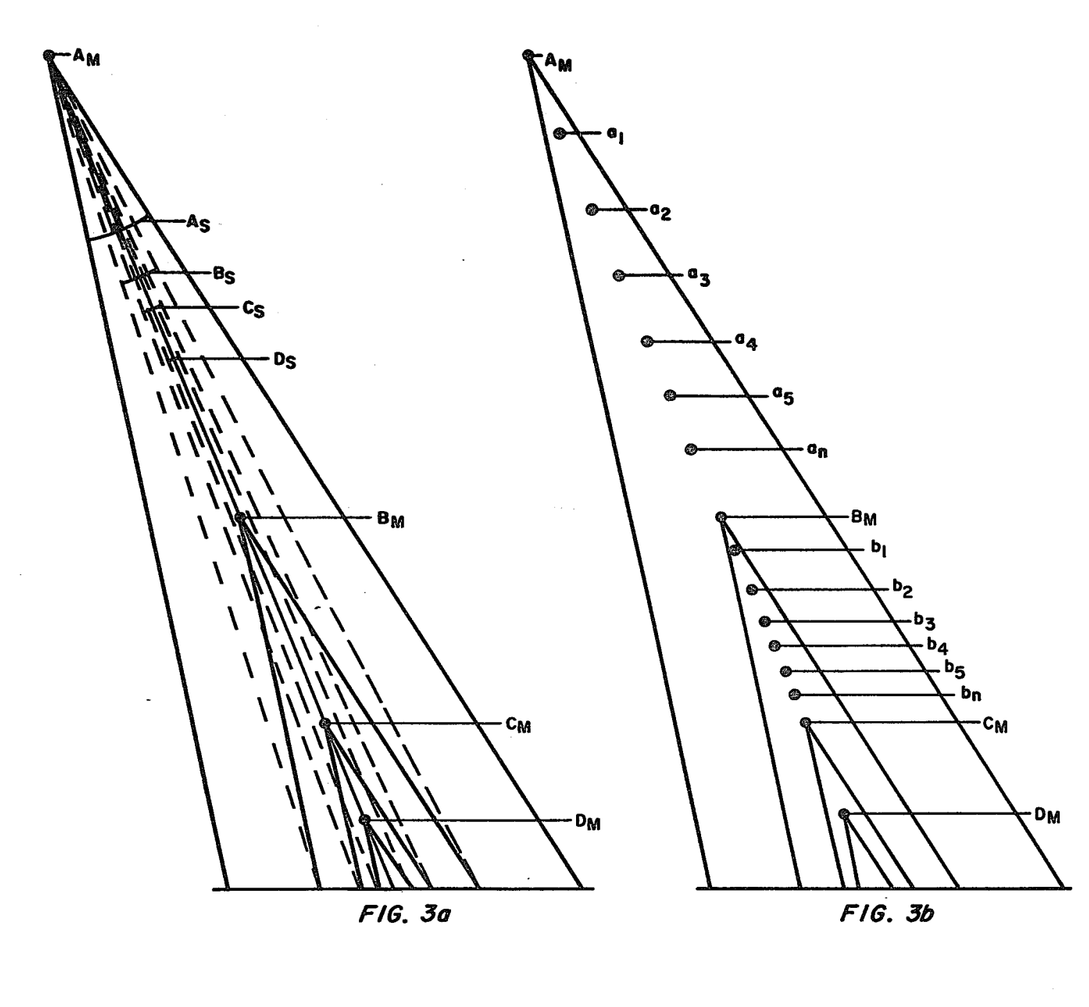
FIG. 3a is a diagram associated with the range closure of a missile to a target, with dashed lines representing successively smaller fields of view taken at the original launch range, and solid lines showing positions at which a missile fixed field of view matches the field of view taken at the original launch range.
FIG. 3b is a similar diagram utilized in connection with a procedure involving automatic rememorization, with the several points representing the approximate position of automatic rememorization occurring during a typical range closure procedure.

Turning now to FIGS. 3a and 3b, it will be noted that in FIG. 3a we have diagrammed the procedure for obtaining successively smaller fields of view of the target from a typical launch range, which scenes or images can be matched in each instance by a single large field of view at respective closer ranges to the target. The dashed lines in FIG. 3a represent these successively smaller fields of view taken by the scanner of the MST at the original launch range so as to obtain the four references relative to the target. In each instance this figure shows solid lines extending downwardly so as to define the same field of view as was indicated by the dashed lines. Thus, the solid lines extending downwardly from say point $B_M$ subtend the same angle as the dashed lines representing the angle $B_S$ that extend downwardly from point $A_M$, and the solid lines extending downwardly from point $C_M$ subtend the same angle as the dashed lines associated with $C_S$ that extend downwardly from point $A_M$. (The subdesignations M and S pertain to missile and scanner, respectively.)

FIG. 3b represents the procedure involving automatic rememorization, with points $a_1$ through $a_5$ representing the approximate positions of automatic rememorizations that occur during a typical range closure precedure followed by the PACT in traveling between point $A_M$ and point $B_M$. These rememorizations involve a switching back and forth between the tracks of the Automatic Memory 60, to minimize null point shift from the target.

It should be noted that rememorization location $a_1$ represents the location that is approximately 90% of the range between $A_M$ and the target. Similarly, point $a_2$ represents the location that is 90% of the range between $a_1$ and the target, and $a_3$ represents the location that is 90% of the range between $a_2$ and the target, and so on to $a_n$.

The locations $B_M$, $C_M$, and $D_M$ represent locations at which the second, third and fourth images from the MST are utilized, and it should be noted that the "pull in" region around each of these points using the large field of view is much larger than that required by the system for realignment.

We will now seek to describe the procedure by which our Prestored Area Correlator Tracker is guided to a target utilizing the rememorization techniques associated with the automatic Portion of Memory and the previously obtained target scenes stored in the Pre-stored Portion of Memory.

The aircraft carrying the missile to be launched is of course equipped with a MST device by means of which the pilot has obtained the four area correlator signatures of the target utilizing in each instance a different field of view setting. As explained in connection with FIG. 3a, these images closely relate to the view of the target that will be seen by the PACT at different approach distances to the target.

In the tracker before launch, the first MST reference is used, with the tracker being set to the large or 20° field of view for initial acquistion of the scene. The large field of view is used because of its large pull-in capability. This comparison of the first MST reference with the image seen with the 20° field of view is used to correct for any initial boresight error in the missile tracker with respect to the target.

Once the errors between the first reference and the 20° field of view are nulled out, the tracker switches to its rate stable mode and to the 4° field of view and proceeds to memorize the target scene. Then, since the target has been acquired, the missile is launched, with the tracker set in the 4° field of view inasmuch as the small field of view enables more accurate tracking.

Figure 4:
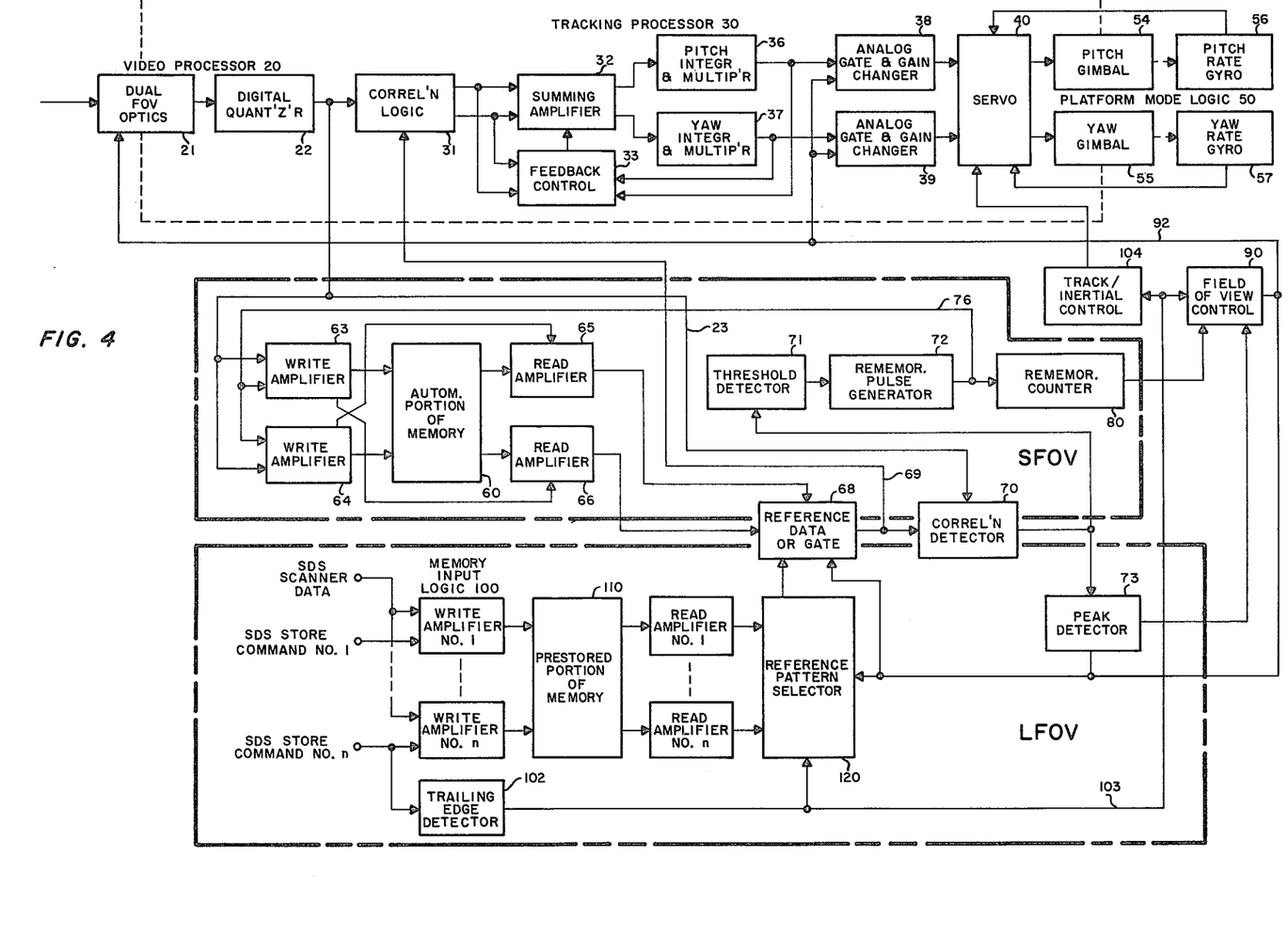
FIG. 4 is a more detailed block diagram, showing a Store Down Stream embodiment of the present invention, with small field of view and large field of view portions being appropriately identified.

Starting at this time, several rememorizations are caused to take place during range closure, this of course being effected by switching between the Write Amplifiers 63 and 64 of the Automatic Portion of the Memory, which are cross connected to their respective Read Amplifiers; see FIG. 4. This procedure serves to maintain effective tracking of the target, which would not otherwise be possible during range closure because of the "blow up" or enlargement of the target. These locations involving rememorization subsequent to launch are shown at $a_1, a_2, a_3, \ldots a_n$ etc., whereas rememorization subsequent to the use at $B_M$ of the second prestored memory are shown at $b_1, b_2, b_3, \ldots b_n$ etc. After the "$n^{th}$" rememorization, the missile tracker switches to the 20° field of view and tracks the scene using the appropriate prestored reference.

When the proper range closure has taken place the correlation will reach a peak. At the first sign that the correlation voltage has dropped, the device is switched to the 4° field of view while under rate gyro control. It then takes its own memory as at the beginning of this procedure, and such procedure is then repeated.

Turning now to FIG. 4, it will be noted that the target image information is delivered to the Dual Field of View Optics 21, which, along with the Digital Quantizer 22, form the Video Processor 20 depicted in FIG. 1. The Dual FOV Optics, as previously discussed, involve an objective lens 62 utilized in conjunction with the Shoch shutter invention represented by disks 28 and 29 disposed at the image plane. By appropriate manipulation of the one disk with respect to the other during their rotation, our apparatus may selectively switch between a large field of view and a small field of view.

The target image is converted from light information to electrical information by the light sensor, which as previously mentioned may be a photodiode or a photomultiplier tube. More particularly, the light is transmitted such as by fiber optics or a light pipe to the photosensitive surface of the photodetector, which device functions to convert the average value of light into voltages that may be regarded as the analog signature of the target. The output of the photodetector is filtered, amplified and digitized in the Digital Quantizer 22. The video is then zeor thresholded to provide a digital signal which may be regarded as the digital signature, or referred to in certain contexts as "live data." This data is then supplied to the Correlation Logic, to the Write Amplifiers, and to the Correlation Detector, as discussed hereinafter.

The Correlation Logic 31 may be regarded as the first component of the Tracking Processor 30, and this device 31 serves to compare the digitized data with prestored reference data from the Reference Data OR Gate 68. If the two data are in coincidence, there is no output on its two output leads. However, when the data are not in coincidence, advance and retard pulses indicating a shift or change in the target scene are directed by the Correlation Logic into the Summing Amplifier 32. The Correlation Logic device is the invention of George Lamar Harmon, and is represented by U.S. Pat. No. 3,521,172 entitled "Binary Phase Comparator" and assigned to the assignee of the present invention.

The Summing Amplifier 32 serves to sum the advance and retard pulses together with pulses from the Feedback Control 33, thus to assure stability in the Tracking Processor. The two outputs of the Summing Amplifier are directed into the Pitch Integrator and Multiplier 36 and the Yaw Integrator and Multiplier 37. The outputs of these circuits represent pitch and yaw information that is extracted by four quadrant multiplier circuits. The outputs of the devices 36 and 37 are directed to the Servo 40 via the Analog Gate and Gain Changer 38 and the Analog Gate and Gain Changer 39, respectively. These devices 38 and 39 determine whether the system operates in a track mode or in a rate mode, and in addition provides a servo gain change which compensates for the optical gain change caused by switching fields of view. By track mode is meant that mode in which the system operates to maintain the tracker axis on a given point in the scene. To do this, the servo receives position error correction voltages from the pitch/yaw integrators 36 and 37 via analog gates 38 and 39, and repositions the gimbals to null out these voltages. By rate mode is meant the mode in which the system attempts to maintain the tracker axis in a fixed spatial angular position. Voltages from the pitch/yaw rate gyros 56 and 57 are used by the servo to null out spatial angular rates.

It should also be noted that outputs from the Pitch Integrator and Multiplier 36 and the Yaw Integrator and Multiplier 37 are also fed back through the Feedback Control 33 to the Summing Amplifier 32 for consideration of stability as set forth in the Bogard et al. U.S. Pat. No. 3,372,890.

The Pitch Gimbal 54 and the Yaw Gimbal 55 have outputs which are connected to the Pitch Rate Gyro 56 and the Yaw Rate Gyro 57, respectively, used to hold constant the direction of the PACT when in the rate mode. These devices put suitable commands back into the Servo, keeping the tracker axis at its last heading.

As previously explained, a two field of view arrangement is preferred for use with our invention, one of these being a small field of view operation, and the other the large field of view operation. As indicated in FIG. 4 of the drawings, a number of components grouped along the center of this figure are related to the small field of view operation and the other components near the bottom of the figure, are related to the large field of view operation, although certain components such as a memory drum, reference Data OR Gate 68, and the Correlation Detector 70 may be regarded as common to both. The memory drum is equipped with a number of tracks, with each track having associated therewith a Write Amplifier and a Read Amplifier. Actually, the same memory drum may serve both memory arrangements, and by multiplexing, the number of read and write amplifiers may be reduced.

As previously indicated, the Automatic Portion of the Memory 60 may involve two tracks of the drum, whereas the Prestored Portion of the Memory 110 may involve a number of tracks of the same drum, usually four or more, upon which the data obtained through operation of the MST is stored. The memory drum is arranged to rotate at the same speed as, and in phase with, the rotating slit arrangement.

One line may be used to bring in data from the MST, where it reaches a gating arrangement of NOR gates, which serve to route the data to the proper track of the Prestored Memory 110. A suitable arrangement in the Memory Input Logic 100 causes the Write Amplifiers to start or stop writing only on a particular edge or change of state of the incoming data, this arrangement serving to eliminate any false pulses in the Memory caused by transients associated with the starting and stopping of the Write Amplifiers.

As indicated in conjunction with the explanation of FIG. 1, when the pilot has aligned the MST with the target he wishes to deliver the missile against, he causes a control signal to be generated in the MST, and the missile Memory to receive the digitized information associated with four fields of view. Several scans of the scanner may be involved in connection with the loading of each of the several memory tracks of the Prestored Memory 110, but the procedure of loading Memory 110 is usually completed in 325 milliseconds or so.

The several tracks of the Prestored Memory 110 are thus loaded with information derived from the MST, with control signals from the MST indicating the particular field of view being used, as well as the proper time for storing these references. As the trailing edge of the last signal is prestored, a detector in the missile generates a pulse which causes the missile tracker to go into the track mode in the large field of view, using the 20° field of view reference obtained from the MST.

It should be noted in connection with FIG. 4, that the Write Amplifiers and the Read Amplifiers associated with the Automatic Memory are cross coupled so as to operate alternately, such that when the Write Amplifier 63 is writing live data upon say track #1 of the Automatic Portion of the Memory, the previously recorded data on the other track, that is, track #2, is being read by the Read Amplifier 66. The operation of these Write and Read Amplifiers are switched at time of rememorization, so as to next cause, in the present instance, Write Amplifier 64 to commence placing live data on track #2 and Read Amplifier 65 to commence reading track #1.

This alternate writing and reading in the Automatic Portion of the Memory is controlled by a rememorization pulse originating in the Rememorization Pulse Generator 72 and delivered on lead 76 to the Write Amplifiers 63 and 64. This rememorization pulse is delivered on several different occasions during the time that the PACT is involved in a range closure operation. The rememorization pulse is generated when a certain degree of decorrelation of the live data and the stored data being compared in the Correlation Detector 70 takes place. The coincidence function is averaged by a filtering device, and then threshold detected at a preset threshold in Threshold Detector 71. When the decorrelation as represented by a DC level falls below the preset threshold, this action causes a one shot in the Rememorization Pulse Generator 72 to develop the rememorization pulse, which is then delivered to the Write Amplifiers of the Automatic Memory as indicated.

The Write Amplifiers 63 and 64 are amplifiers that accept the digitized data and write information on respective tracks of the magnetic memory drum associated with the Automatic Portion of Memory, as previously indicated, whereas the Read Amplifiers 65 and 66 are high gain differetial amplifiers that alternately read the information stored on the memory tracks associated with automatic rememorization. Only one Read Amplifier at a time is delivering an output through the Reference Data OR Gate 68 to be compared, while at this same time the other track of the automatic memory is being updated.

The Reference Data OR Gate 68 is a group of AND and OR gates that controls whether at a given instant in time, it is prestored data or rememorized data that is being compared to the live data. This gate therefore may in effect be regarded as the source of all reference data, whether it be of a prestored nature or automatic nature. Thus, the gate 68 is connected to accept outputs of the Read Amplifiers associated with the Automatic Portion of Memory, or alternatively, the Read Amplifiers associated with the Prestored Portion of Memory, to be discussed hereinafter. The decision to accept one or the other types of data is determined by a command received from the FOV Control 90.

The output from the Reference Data OR Gate 68 is compared in the Correlation Detector 70 with live data conducted over lead 23 from the Digital Quantizer 22. The Correlation Detector 70 is an exclusive OR circuit whose output is a constant level until decorrelation of the two inputs occurs. At such time as decorrelation has in fact taken place, this level decreases and causes Threshold Detector 71 and Peak Detector 73 to be operated. The output of the Threshold Detector 71 causes the rememorization pulse previously spoken of to be generated by the Rememorization Pulse Generator 72, with Rememorization Counter 80 also being arranged to receive and count each rememorization pulse.

After the Rememorization Counter has counted the $n^{th}$ pulse (for example, the 5th pulse), it is reset, and causes the Field of View Control 90 to be operated to cause by a signal carried on lead 92 to the Dual FOV Optics, the field of view to be changed over to the large field of view. Also, a signal is sent whereby the Reference Pattern Selector 120 is caused to sequence to the next prestored reference that was previously placed in the Prestored Portion of Memory 110. This new reference is directed to the Reference Data OR Gate 68, where it is gated through to the Correlation Detector 70, and on lead 69 to the Correlation Logic 31. In the Correlation Detector 70 the live data and the prestored data are compared, whereas in the Correlation Logic 31, pitch and yaw position data for platform control is generated.

The calling up of the prestored scans of the missile Memory 110 is accomplished by the use of logic coincidence gates along with a shift register, these being contained in Reference Pattern Selector 120. Each time the shift register is advanced, a digital ONE is switched, on stage at a time, through the shift register, thus preforming a switching function that enables a single digital signature at a time to be recalled from Memory 110 in a logic-exclusive fashion. Thus, an exclusive output from a predetermined track of the prestored memory, corresponding to the view of the target from a particular range, may be utilized at the proper time in order to realign the missile with the target in a very accurate manner, and thus compensate for the drift normally encountered during range closure.

The aforementioned routine is cyclic in that each time the correlation voltage falls below a predetermined threshold level, rememorization is caused to occur in the manner previously described. After a pre-established number of rememorizations indicating that a sufficient amount of range closure has taken place, the field of view is changed, a new prestored reference from the Prestored Portion of Memory is sequenced, correlation is checked, and the small field of view routine repeated, thus assuring a high degree of accuracy.

Turning now to the lower portion of FIG. 4, it will be noted that there are a number of inputs identified as SDS Store Commands, with one of these inputs being associated with each of the "n" Write Amplifiers of the Memory Input Logic 100. There is one Write Amplifier associated with each memory track of the Prestored Portion of Memory 110. The Memory 110 may be deemed to include a Read Amplifier for each track, which for example, may be four in number. As should now be apparent, as the data is received from the MST, Reference #1 is placed by Write Amplifier #1 on Track No. 1, Reference No. 2 is placed by Write Amplifier No. 2 on Track No. 2, and so on until all "n" inputs created by the MST have been placed upon respective tracks of the Prestored Portion of Memory 110.

The final SDS Store Command is connected to the Trailing Edge Detector 102, and at the trailing edge of the $n^{th}$ reference, a pulse is generated by the Trailing Edge Detector. The Trailing Edge Detector is connected by lead 103 to the Field of View Control 90, and the Track/Inertial Control 104. Therefore, this pulse brings about a signal on lead 92 from the Field of View Control 90, which causes the Dual FOV Optics to switch to the large field of view. The pulse from the Trailing Edge Detector also brings about by operation the Track/Inertial Control 104 a switching to the prestored track mode that always is used in conjunction with the large field of view. This pulse is further used to sequence the Reference Pattern Selector 120 to utilize the first large field of view reference, and to inhibit all the others.

Figure 5:
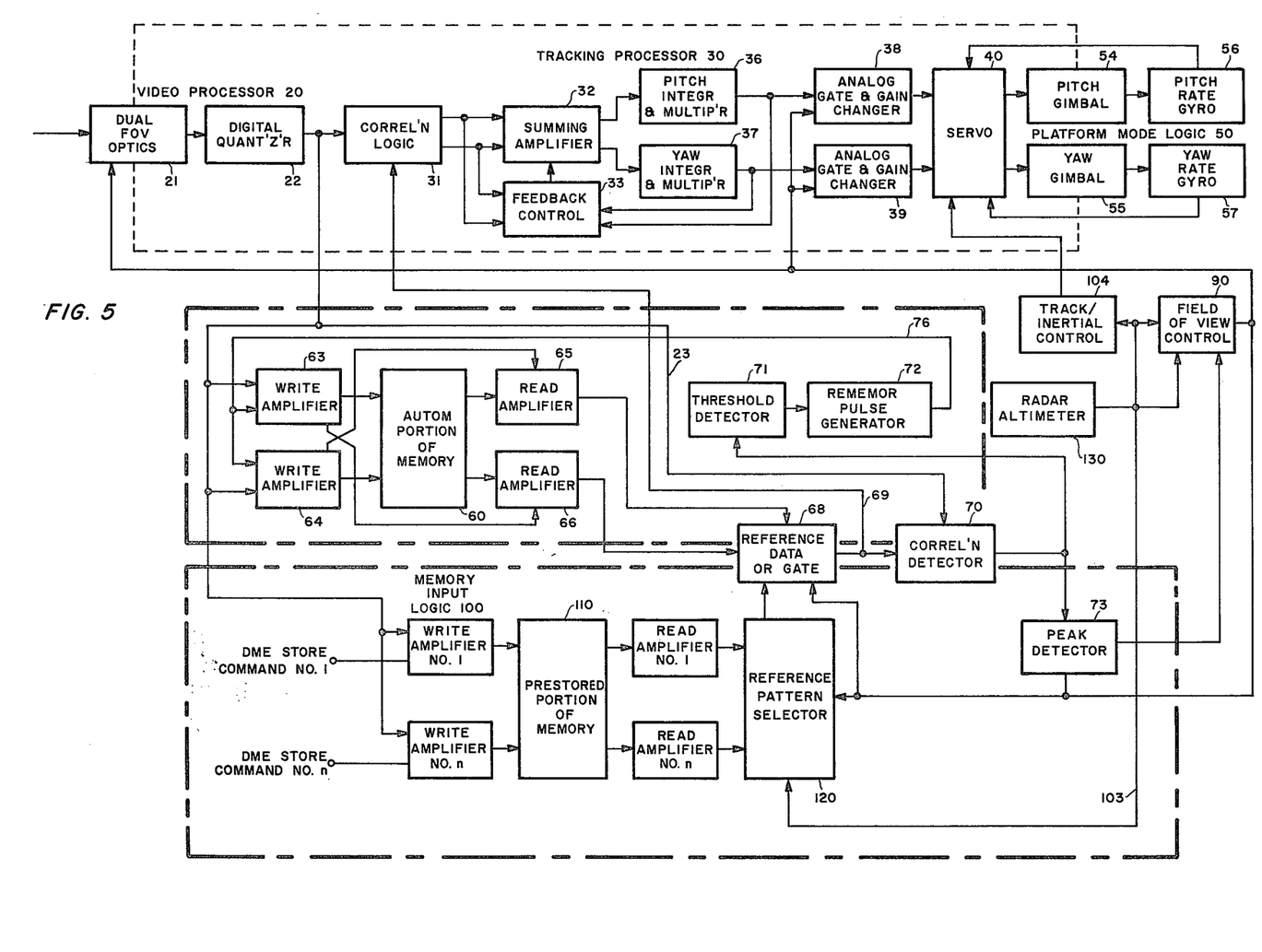
FIG. 5 is another detailed block diagram, this being a version of this invention employed with midcourse guidance scheme using Distance Measuring Equipment, in which embodiment a radar altimeter is employed to control the insertion of new prestored references and to control the fields of view.

This first reference is now sampled, and if a peak of correlation is reached, the Peak Detector 73 generates a pulse delivered to the Field of View Control 90 that causes the first small field of view subroutine to commence. When the first small field of view subroutine has been completed, the second large field of view routine is sequenced by the output of the Rememorzation Counter 80. These large and small field of view subroutines of course alternate until all of the large field of view prestored references have been sampled, with the PACT thereafter tracking in the small field of view until impact has taken place. Turning to FIG. 5, an alternative embodiment of the functional portion of a PACT device is there shown, this arrangement being designed for use with a DME mid-course guidance system. This embodiment principally differs from the embodiment discussed at length in conjunction with FIG. 4, in that the source of the prestored references is different, as is the manner in which the various references are selected for use during range closure.

It will be understood from the lower left portion of FIG. 5 that a series of DME store commands is inserted, typically before the missile departs on a mission. This is to say, the PACT in this embodiment is prebriefed by obtaining and memorizing correlator scans of a magnified photographic transparency, employed at various levels of magnification. A preferred manner of accomplishing this is by the use of a RID device, which provides to the PACT Scanner an appropriately scaled target scene image. With this arrangement, the scanner is operated along with its synchronized memory to memorize reference signatures developed by scanning the afore-mentioned image. More than one reference may be produced by changing the photographic magnification within the RID to correspond accurately with an aerial scene as viewed at preselected altitudes.

An alternative arrangement to the use of a RID device directly with the PACT as described above involves the use of a portable synchronous magnetic memory drum scanner assembly. This assembly would contain a 20° field of view scanner similar to that in the PACT in conjunction with a synchronous memory. References would be stored by scanning the appropriately scaled images in the RID device. These references are stored within the portable magnetic memory on predetermined tracks.

Once this memorization is accomplished, the portable memory-scanner assembly is carried to the missile or missiles to be used on a given flight, with the loaded memory drum being connected electrically in a suitable manner to the PACT of each missile. This memory scanner assembly is synchronized automatically with the rotating memory in the missile and once synchronization has taken place the operator commands a transfer of the memories to the missile memory. An indicator light would inform the operator when a successful transfer had been achieved.

As will be noted from the right center portion of FIG. 5, a Radar Altimeter 130 is connected to lead 103 so that it can be utilized to bring about a switching of the prestored references. This Radar Altimeter is arranged to switch in the large field of view along with the appropriate references at preselected altitudes to maintain a very accurate alignment with the target, in the manner previously discussed. The Radar altimeter is of course utilized instead of the rememorization counter of FIG. 4 for metering range during range closure.

In a typical DME mission, after the mid-course guidance phase has been completed, the missile is placed in a near vertical terminal trajectory. The references, for example, may be scaled for use at say 10,000 feet, 5,000 feet, 2,500 feet and 1,250 feet, or of course in some other arrangement in which the second reference is used after approximately 50% range closure has taken place, the third reference used when 50% of the remaining range closure has taken place, and so on. Automatic rememorization between references is utilized in the general manner described above.

Presuming the altitudes just described, the radar altimeter would typically be arranged to switch in the first reference when passing say 11,000 foot altitude, and also to switch in the large field of view and the track mode. The correlator at this point should pull in on the target and start tracking the 10,000 foot reference. The correlation peak as measured by the correlation detector should reach a maximum as the missile passes through the 10,000 foot altitude for which the reference was scaled. Upon reaching such a peak of correlation, a command is generated causing the system to switch to the four degree field of view subroutine as described earlier.

It should be noted that any usage of the PACT in a missile involves a synchronization of the remote memory drum located in the missile with the rotating scanner in the gimballed tracker of the missile. Such synchronization is accomplished automatically in accordance with an electronic technique by Donald R. Mays, assignor to the assignee of the present invention.

Figure 6:
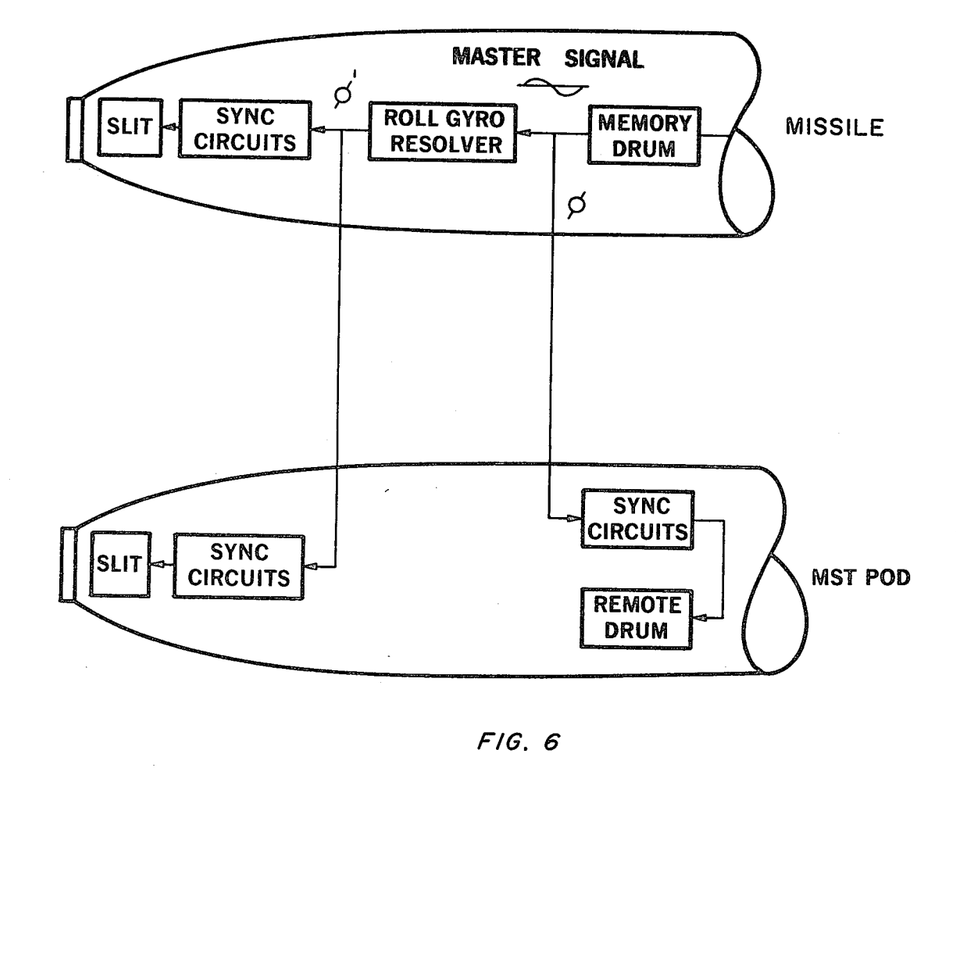
FIG. 6 is a simplified diagram concerned with a Store Down Stream embodiment used in conjunction with a Magnifier Scanner Tracker.

In addition when the Store Down Stream embodiment is utilized, the remote memory and scanning slit of the MST must be synchronized with their comparable components in the missile; note FIG. 6. When the missile is in free flight in the Store Down Stream mode and not under a precise roll control, a roll gyro with resolver outputs must be employed to determine any missile roll deviation from its roll position when the MST generated references were stored prior to its launch from the aircraft. The above mentioned roll deviation is inserted as an angular phase shift betweeen the remote memory and the scanner slit. For example, this operation will cause the scanner slit to see the 12 o'clock position of the earth scene at the same instant that the remote memory read head which has rotated with the missile senses the memory pulse corresponding to the 12 o'clock position in earth coordinates. Thus, this arrangement makes unnecessary the employment of a tracker roll gimbal with its associated drive torquers and servo electronics. Furthermore since the prestored references were made at the roll orientation prior to launch, said orientation has been maintained by use of the roll angle phase shift generated by the gyro such that the prestored reference pulses are read out of the memory at the same instant that the scanner slit is viewing the appropriate portion of the earth scene.

We have found by simulation that the high inertia component of the synchronizing system (minimum coupling with the airframe) should be regarded as the "master" component for minimizing errors in synchronization under missile roll acceleration transients. Therefore, as seen in FIG. 6, the missile memory drum is to be regarded as the master.

The sync circuit of the missile is responsible for keeping the missile slit in sync with the missile memory drum, and in a similar manner, the sync circuits in the MST pod keep their respective slit and drum in sync with their counterparts in the missile.

Although we have described our invention as principally involving a tracker for a missile or other vehicle, it should be borne in mind as also involving apparatus for determining angular misalignment between a desired aim point and an actual aim point of a device, comprising memory means for storing a plurality of related signals representing the appearance of the aim point area at an initial range and at successively closer ranges to such aim point, scanning means for generating a current signal indicative of the area about the actual aim point, and means for determining angular misalignment between said current signal and said memory signals.

We claim:

1. Apparatus for determining angular misalignment between a desired aim point and an actual aim point of a missile or other vehicle, comprising memory means for prestoring at least three related signals representing the appearance of the aim point area at an initial range and at successively closer ranges to such aim point, scanning means for generating a current signal indicative of the area about the actual aim point, and means for sequentially utilizing the prestored signals in determining angular misalignment between the current signal and the memory signals.

2. A tracker for minimizing angular misalignment between a desired aim point and an actual aim point of a missile or other vehicle, comprising memory means for prestoring at least three related signals representing the appearance of the aim point area at an initial range and at successively closer ranges to such aim point, scanning means for generating a current signal indicative of the area about the actual aim point, means for sequentially utilizing the prestored signals in determining angular misalignment between the current signal and the memory signals, and means for realigning the actual aim point with the desired aim point.

3. The tracker as defined in claim 2 in which the prestored related signals are provided by a reference insertion device utilizing a photographic representation of the aim point.

4. The tracker as defined in claim 2 in which the prestored related signals are provided by airborne apparatus which views the target scene directly.

5. The tracker as defined in claim 2 in which rememorization logic apparatus is used to make automatic references by a direct viewing of the scene, thereby reducing the required number of prestored related signals.

6. The tracker as defined in claim 5 in which the prestored related signals are made by the use of a reference insertion device.

7. The tracker as defined in claim 5 in which the prestored related signals are made by a magnifier scanner tracker device.

8. A tracker for minimizing angular misalignment between a desired aim point and an actual aim point of a missile or other vehicle, comprising memory means for prestoring at least three related signals representing the appearance of the aim point area at an initial range and at successively closer ranges to such aim point, a multiple switchable field of view scanning means for generating current signals indicative of the area about the actual aim point, means for determining angular misalignment between said current signals and said memory signals, and means for sequentially utilizing the prestored signals in realigning the actual aim point with the desired aim point, said multiple field of view either providing increased acquisition capability with a larger field of view, or improved accuracy with a smaller field of view.

9. The tracker as defined in claim 8 in which the prestored related signals are provided by a reference insertion device utilizing a photographic representation of the aim point.

10. The tracker as defined in claim 8 in which the prestored related signals are provided by airborne apparatus which views the target scene directly.

11. The tracker as defined in claim 8 in which rememorization logic apparatus is used to make automatic references by a direct viewing of the scene, thereby reducing the required number of prestored related signals.

12. The tracker as defined in claim 11 in which the prestored related signals are made by the use of a reference insertion device.

13. The tracker as defined in claim 11 in which the prestored related signals are made by a magnifier scanner tracker device.

14. A tracker for minimizing angular misalignment between the actual aim point of a missile and a desired aim point, including memory means for storing a plurality of related signals representing the appearance of the aim point area at an initial range and at successively closer ranges to the desired aim point, said plurality of related signals involving a plurality of prestored references utilized in a preestablished order for missile guidance, scanning means for generating a current signal indicative of the area about the actual aim point, means for sequentially utilizing the prestored references in determining angular misalignment between the current signal and the memory signals, and servo means for realigning the actual aim point with the desired aim point.

15. The tracker as defined in claim 14 in which rememorization means are utilized for periodically updating the current signal representing the area around the actual aim point, thus enabling the number of required prestored references for accurately guiding the missile to be minimized.

16. The tracker as defined in claim 14 in which the plurality of prestored references is obtained by means for accurately scaling reconnaisance photographs, said means producing therefrom digital representations of the aim point scene.

17. The tracker as defined in claim 14 in which the plurality of prestored references is obtained by means of an apparatus carried aboard a launching aircraft, said apparatus having multiple field of view capability, and providing properly scaled representations of the aim point area in digital format.

18. The tracker as defined in claim 14 in which multiple switchable field of view scanning means is provided for generating current signals indicative of the area about the actual aim point.

19. A tracker for minimizing angular misalignment between the actual aim point of a missile and a desired aim point, including memory means for storing a plurality of related signals representing the appearance of the aim point area at an initial range and at successively closer ranges to the desired aim point, such plurality of related signals involving a plurality of prestored references utilized in a preestablished order for missile guidance, multiple field of view scanning means for generating current signals indicative of the area about the actual aim point, means for selectively switching between a large field of view used for acquisition of a target and a small field of view for accurate tracking purposes, means for sequentially utilizing the prestored references in determining angular misalignment between the current signals and the memory signals, and means for realigning the actual aim point with the desired aim point.

20. The tracker as defined in claim 19 in which rememorization means are utilized for periodically updating the current signal representing the area around the actual aim point, thus enabling the number of required prestored references for accurately guiding the missile to be minimized.

21. The tracker as defined in claim 19 in which said plurality of prestored references is obtained from ancillary means for accurately scaling reconnaissance photographs, said means producing therefrom digital representations of the aim point scene.

22. The tracker as defined in claim 19 in which said plurality of prestored references is obtained by means of an apparatus carried aboard a launching aircraft, said apparatus having multiple field of view capability, and providing properly scaled representations of the aim point area in digital format.

23. A tracker for minimizing angular misalignment between a desired aimpoint and an actual aimpoint of a missile or other vehicle, comprising a multiple, switchable field of view means for providing real time scans of the actual aimpoint, means for sensing and processing said real time scans to obtain current signals, memory means for prestoring at least three related reference signals representing the appearance of the desired aimpoint at an initial range and at successively closer ranges to such aimpoint, said memory means also including means for storing one or more current signals generated from real time scans of the actual aimpoint, means for selecting from the memory the appropriate reference signals, means for correlating the selected reference signals with the current signals to continuously determine the angular misaligment of the actual aimpoint with the desired aim-point, and servo means for reducing the angular misalignment of the actual aimpoint with the desired aimpoint represented by the reference signals.

24. The tracker as defined in claim 23 in which the prestored related reference signals are provided by a reference insertion device utilizing a photographic representation of the aimpoint.

25. The tracker as defined in claim 23 in which the prestored related reference signals are provided by airborne apparatus which views the target scene directly.

* * * * *